(12) United States Patent
Hyun

(10) Patent No.: US 8,867,909 B2
(45) Date of Patent: Oct. 21, 2014

(54) TOUCH-TYPE PORTABLE TERMINAL

(75) Inventor: Jinwook Hyun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 272 days.

(21) Appl. No.: 13/560,478

(22) Filed: Jul. 27, 2012

(65) Prior Publication Data

US 2013/0027353 A1    Jan. 31, 2013

(30) Foreign Application Priority Data

Jul. 28, 2011    (KR) .................. 10-2011-0075426

(51) Int. Cl.
*G03B 13/36* (2006.01)
*H04N 5/232* (2006.01)
*G06F 3/041* (2006.01)
*G03B 17/20* (2006.01)

(52) U.S. Cl.
CPC ....... *H04N 5/23212* (2013.01); *H04N 5/23293* (2013.01); *G03B 17/20* (2013.01); *H04N 5/232* (2013.01); *G03B 13/36* (2013.01); *G06F 3/041* (2013.01)
USPC .......................................... 396/121; 396/147

(58) Field of Classification Search
CPC ........................................................ G03B 13/36
USPC .................................................. 396/121, 147
See application file for complete search history.

(56) References Cited

U.S. PATENT DOCUMENTS

| | | | |
|---|---|---|---|
| 4,827,303 A * | 5/1989 | Tsuboi | 396/123 |
| 7,781,710 B2 * | 8/2010 | Higashino | 250/201.2 |
| 2002/0122121 A1 * | 9/2002 | Fujii et al. | 348/240 |
| 2013/0027353 A1 * | 1/2013 | Hyun | 345/175 |

* cited by examiner

*Primary Examiner* — W B Perkey

(74) *Attorney, Agent, or Firm* — Birch, Stewart, Kolasch & Birch, LLP

(57) ABSTRACT

A touch type portable terminal is disclosed, whereby a user is prevented from viewing a wrong auto focusing area by indicating an indicator in response to changes in view angle of lenses during auto focusing operation.

13 Claims, 6 Drawing Sheets

TOUCH-TYPE PORTABLE TERMINAL

Pursuant to 35 U.S.C. §119 (a), this application claims the benefit of earlier filing date and right of priority to Korean Patent Application No. 10-2011-0075426, filed on Jul. 28, 2011, the contents of which are hereby incorporated by reference in their entirety.

BACKGROUND OF THE DISCLOSURE

1. Field

The present disclosure relates to a touch type portable terminal.

2. Background

In general, a portable terminal is a portable device capable of performing various functions. Various advanced functions are now being included in a portable terminal, such as a portable phone, so that it may provide a user with increased convenience. That is, the portable terminal may execute various advanced functions such as a short message transmission/reception function, a digital broadcasting receiving function, and a music playback function, an audio and image communication function, information input/output function, data storage function as well as a general voice calling function.

Many new attempts in terms of hardware and software aspects are applied to the above-described portable terminals of multiple functions to realize complex functions. Thus, the portable terminal can perform as a camera, music or moving picture player. Furthermore, the portable terminal is regarded as a personal belonging for expressing individuality and thus requires various designs to cater to personal choices.

That is, as functions of the portable terminal are diversified, the portable terminal is implemented as a multimedia player provided with composite functions such as photographing of photos or moving pictures, playback of music or moving picture files, game play, broadcast reception and the like, for example. To implement the complex functions in the multimedia player, improvement of structural parts and/or software parts of the terminal may be considered in various attempts.

Meanwhile, the portable terminal is applied with a kind of an input device capable of manipulating an electronic device in conversational method by using only a screen without any knowledge of electronic devices such as a touch screen or a touch panel, thereby providing a user with convenience. That is, the portable terminal is a combination of sophisticated technologies capable of replacing a conventional key pad or a button by a simple touch or punch with a finger on a screen of a touch screen, a touch panel or an electronic device.

At this time, the touch screen or the touch panel can advantageously save a space, improve manipulability and convenience, provide simplicity in specification change and increase a user recognition as well as compatibility with other information technology devices. Due to these advantages, the portable terminal is widely used in various fields such as industrial, transportable, serviceable, medical and mobile fields.

However, the portable terminal has a problem in that a user may recognize a wrong auto focusing area due to improper response to changes in view angle of a lens.

SUMMARY OF THE DISCLOSURE

An exemplary aspect of the present invention is to substantially solve at least the above problems and/or disadvantages and to provide at least the advantages below. Accordingly, an aspect of the present invention provides a touch type portable terminal configured to prevent a user from recognizing a wrong auto focusing area by displaying an indicator in response to changes in view angle of a lens.

In one general aspect of the present disclosure, there is provided a touch type portable terminal, the portable terminal comprising: a touch panel receiving a touch pressure; a display unit mounted at a bottom surface of the touch panel to display an image; a coordinate calculator calculating a coordinate of a touched area of the touch panel; a measured distance value detector detecting a measured distance value, which is a distance between a subject corresponding to the touched area and a camera module; storage stored with an indicator indicating the touched area; a camera module photographing the subject and performing an auto focusing by moving a lens using the measured distance value; an image processor receiving the indicator stored in the storage, moving a position of the indicator from an image of the subject auto focused by the camera module in response to a view angle changed by the lens movement, and displaying on the display unit; and a controller recognizing the touched area using the coordinate calculated by the coordinate calculator, and controlling the camera module for performing auto focusing of the touched area using the measured distance value detected by the measured distance value detector.

In some exemplary embodiments of the present disclosure, the storage may be stored with an indicator position moved distance data in response to the changes in view angle, and the controller may control the image processor, such that the indicator is combined with the auto focused image of the subject using the stored indicator position moved distance data in response to the changes in view angle.

In some exemplary embodiments of the present disclosure, the touch type portable terminal may further comprise an image extractor extracting an image of the touched touch panel, and the image processor may match the image of the touched touch panel extracted by the image extractor to the position of the indicator, in a case the position of the indicator is moved from the auto focused image of the subject in the camera module in response to the changes in view angle.

In some exemplary embodiments of the present disclosure, the camera module may include a lens unit including lenses receiving an optical image of a subject, a lens driving unit receiving a control signal of the controller to move the lenses of the lens unit, and an image sensor converting the optical image of the subject to an electrical signal through the lens unit.

In some exemplary embodiments of the present disclosure, the touch panel may be divided into a plurality of sub areas, and the touched area is one of the plurality of sub areas.

In some exemplary embodiments of the present disclosure, the storage may be stored with the measured distance value detected by the measured distance value detector, the value being matched by each of the sub areas.

In another general aspect of the present disclosure, there is provided a touch type portable terminal, the portable terminal comprising: a touch panel receiving a touch pressure; a display unit mounted at a bottom surface of the touch panel to display an image; a coordinate calculator calculating a coordinate of a touched area of the touch panel; a measured distance value detector detecting a measured distance value, which is a distance between a subject corresponding to the touched area and a camera module; a camera module photographing the subject and performing auto focusing by moving lenses using the measured distance value; an image processor moving a position of the indicator from an image of the subject auto focused by the camera module in response to a view angle changed by the lens movement, and displaying on the display unit; and a controller recognizing the touched area using the coordinate calculated by the coordinate calculator, and controlling the camera module for performing auto focusing of the touched area using the measured distance value detected by the measured distance value detector.

In some exemplary embodiments of the present disclosure, the touch type portable terminal may further comprise an image extractor extracting an image of the touched touch panel, and the image processor may match the image of the touched touch panel extracted by the image extractor to the position of the indicator, in a case the position of the indicator is moved from the auto focused image of the subject in the camera module in response to the changes in view angle.

In some exemplary embodiments of the present disclosure, the camera module may include a lens unit including lenses receiving an optical image of a subject, a lens driving unit receiving a control signal of the controller to move the lenses of the lens unit, and an image sensor converting the optical image of the subject to an electrical signal through the lens unit.

In some exemplary embodiments of the present disclosure, the touch panel may be divided into a plurality of sub areas, and the touched area is one of the plurality of sub areas.

In still another general aspect of the present disclosure, there is provided an auto focusing method of a touch type portable terminal, the method comprising: detecting a measured distance value, which is a distance between a subject corresponding to a touched area and a camera module, in a case a touch panel area corresponding to a particular area of a photographed image of a subject is touched; obtaining an image of the subject by performing auto focusing by moving lenses of the camera module using the detected measured distance value; and positioning an indicator on the particular area of the image of the subject in response to a view angle changed by the movement of the lenses.

In some exemplary embodiments of the present disclosure, the step of positioning an indicator on the particular area of the image of the subject in response to a view angle changed by the movement of the lenses may include combining the indicator to the particular area of the image of the subject using an indicator position movement distance data in response to changes in view angle stored in storage, and positioning the combined indicator.

In some exemplary embodiments of the present disclosure, the touch panel may be divided into a plurality of sub areas, and the touched area is one of the plurality of sub areas.

The touch type portable terminal according to exemplary embodiments of the present disclosure has an advantageous effect in that a user is prevented from viewing a wrong auto focusing area by indicating an indicator in response to changes in view angle of lenses during auto focusing operation.

Other exemplary aspects, advantages, and salient features of the disclosure will become more apparent to persons of ordinary skill in the art from the following detailed description, which, taken in conjunction with the annexed drawings, discloses exemplary embodiments of the invention.

Before undertaking the DETAILED DESCRIPTION OF THE DISCLOSURE below, definitions of certain words and phrases used throughout this patent document are set forth: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
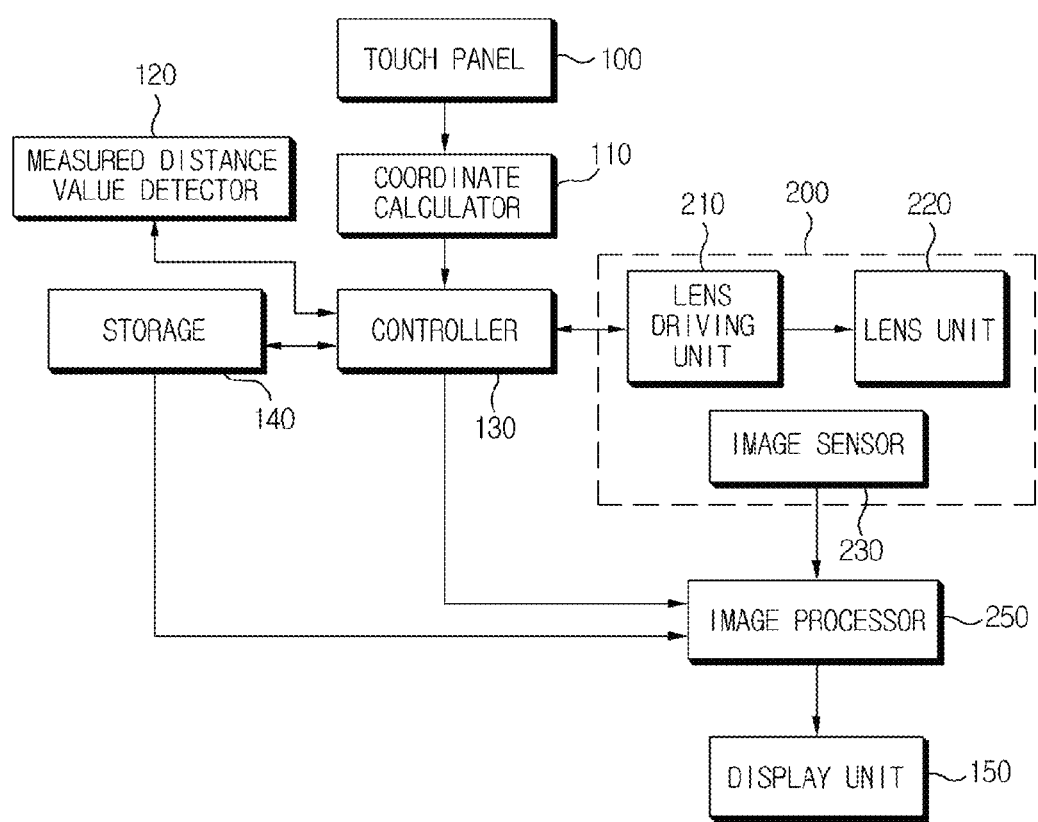
FIG. 1 is a schematic block diagram of a touch type portable terminal according to an exemplary embodiment of the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, PDAs (personal digital assistants), PMPs (portable multimedia players) and/or navigators.

A further description may be provided with regard to a mobile terminal, although such teachings may apply equally to other types of terminals such as stationary terminals that include digital TVs and desktop computers, the details of which are well known to the persons in the art.

The portable terminal according to exemplary embodiments of the present disclosure may be implemented in a variety of different configurations, e.g., a bar type terminal body, a folder-type, a slide-type, a rotational-type, a swing-type and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
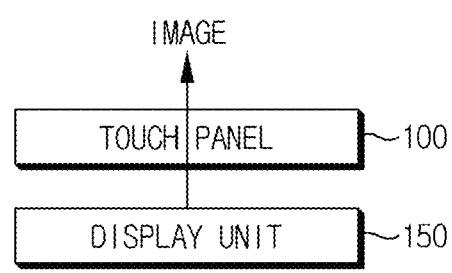
FIG. 2 is a schematic block diagram illustrating a relationship between an indicator and a touch panel of a touch type portable terminal according to an exemplary embodiment of the present disclosure.

FIG. 1 is a schematic block diagram of a touch type portable terminal according to an exemplary embodiment of the present disclosure, and FIG. 2 is a schematic block diagram illustrating a relationship between an indicator and a touch panel of a touch type portable terminal according to an exemplary embodiment of the present disclosure.

The touch type portable terminal according to an exemplary embodiment of the present disclosure includes a touch panel 100 receiving a touch pressure; a display unit 150 mounted at a bottom surface of the touch panel 100 to display an image; a coordinate calculator 110 calculating a coordinate of a touched area of the touch panel 100; a measured distance value detector 120 detecting a measured distance value, which is a distance between a subject corresponding to the touched area and a camera module 200; storage 140 storing an indicator indicating the touched area; the camera module 200 photographing the subject and performing an auto focusing by moving a lens using the measured distance value; an image processor 250 receiving the indicator stored in the storage, moving a position of the indicator from an image of the subject auto focused by the camera module 200 in response to a view angle changed by the lens movement, and indicating on the display unit 150; and a controller 130 recognizing the touched area using the coordinate calculated by the coordinate calculator 110, and controlling the camera module 200 for performing auto focusing of the touched area using the measured distance value detected by the measured distance value detector 120.

Now, operations of each element in the touch type portable terminal according to an exemplary embodiment of the present disclosure will be described.

First, in a case a user photographs a subject using the touch type portable terminal, an image of the photographed subject is displayed on the touch panel 100 via the display unit 150, and a particular area of the subject displayed for auto focusing by the user is touched, the coordinate calculator 110 calculates a coordinate of the touched area on the touch panel.

At this time, the coordinate calculator 110 calculates a coordinate of pixels on a screen of the touch panel 100 generated with a reaction signal, and provides the coordinate to the controller 130. The controller 130 recognizes the touched area on the touch panel 100 using the coordinate calculated by the coordinate calculator 110. The controller 130 controls the measured distance value detector 120 to measure a distance between the camera module 200 and the subject, and receives the measured distance value detected by the measured distance value detector 120.

Meanwhile, the touch panel 100 is comprised of image pixels arranged in length and breadth, and an image and various images captured by the camera module 200 displayed on the display unit 150 are projected on the touch panel 100 as shown in FIG. 2, and in a case a user touches a particular area, a reaction signal is generated from a pixel touched by the user.

The controller 130 controls the camera module 200 for performing an auto focusing of the touched area using the measured distance value detected by the measured distance value detector 120.

Referring to FIG. 1, the camera module 200 includes a lens unit 220 including lenses receiving an optical image of a subject, a lens driving unit 210 receiving a control signal of the controller 130 to move the lenses of the lens unit 220, and an image sensor 230 converting the optical image of the subject to an electrical signal through the lens unit 220.

Furthermore, the touch panel 100 is divided into a plurality of sub areas, and a particular area of the touch panel 100 touched by the user is one of the plurality of sub areas, and the controller 130 recognizes which area is a touched area among the plurality of sub areas using the coordinate calculated by the coordinate calculator 110.

In addition, the storage 140 is a memory capable of storing a variety of information, and is stored with sub area information and measured distance information of each sub area, and stored with measured distance value detected by the measured distance value detector 120, the value being matched by each of the sub areas. The storage 140 is stored with an indicator indicating a touched area, such that the indicator can be displayed on the touched area.

For example, in a case a fruit basket containing an apple is photographed by the camera module 200, and a fruit basket image is displayed on the display unit 150, the fruit basket image is projected on the touch panel 100, and in a case a user touches the apple in the fruit basket image projected on the touch panel 100 for auto focusing, the apple is displayed with the indicator.

Furthermore, the storage 140 may be stored with an indicator position-moved distance data in response to the changes in view angle, and the controller 130 may control the image processor 250 by moving position of the indicator from the auto-focused image of the subject using a indicator position-moved distance data stored in the storage 140 in response to changes in view angle to allow the indicator to be combined with the auto focused image of the subject.

For example, in a case a view angle is changed from a first view angle before auto focusing to a second view angle after the auto focusing, and the storage 140 is stored with an indicator position-moved distance as 'A', the position of indicator is moved as much as 'A' from a position value of the indicator matching to the particular area of the subject before the auto focusing to be combined to the image of the subject after the auto focusing.

In some exemplary embodiments of the present disclosure, the touch type portable terminal may further comprise an image extractor extracting an image of the touched touch panel, and the image processor may match the image of the touched touch panel extracted by the image extractor to the position of the indicator, in a case the position of the indicator is moved from the auto focused image of the subject in the camera module in response to the changes in view angle.

Furthermore, the image processor 250 may combine the indicator stored in the storage 140 to the image of the subject auto focused by the camera module in response to the view angle changed by the lens movement and display the indicator on the display unit 150.

Thus, the touch type portable terminal according to an exemplary embodiment of the present disclosure is advantageous in that an indicator is displayed in response to changes in view angle of lens during auto focusing, whereby a user is prevented from viewing a wrongly auto focused area.

Figure 3:
FIG. 3 is a photographic view illustrating an indicator indicated on a touched area for auto focusing of a touch type portable terminal according to an exemplary embodiment of the present disclosure.

FIG. 3 is a photographic view illustrating an indicator indicated on a touched area for auto focusing of a touch type portable terminal according to an exemplary embodiment of the present disclosure.

As mentioned above, in a case a user touches a particular area of the touch panel for auto focusing in the touch type portable terminal, the touched area is displayed with an indicator 'K1' or 'K2' indicating the touched area as an auto focused area, as illustrated in FIG. 3. At this time, in a case the user selects one particular area of the touch panel, one indicator is displayed.

Furthermore, the touch type portable terminal according to an exemplary embodiment of the present disclosure can read a coordinate of touched area on the touch panel, match the indicator to a square image stored in the storage and display on the display unit. It should be apparent to the skilled in the art that a shape of indicator stored in the storage is not limited to the square shape, but a round or a triangular shape will also do. The indicator 'K1' and 'K2' may be defined as an area touched for auto focusing. Furthermore, it should be also apparent to the skilled in the art that the shape of the indicator is not limited to FIG. 3, but may be applied to other drawings in other various images.

Figure 4:
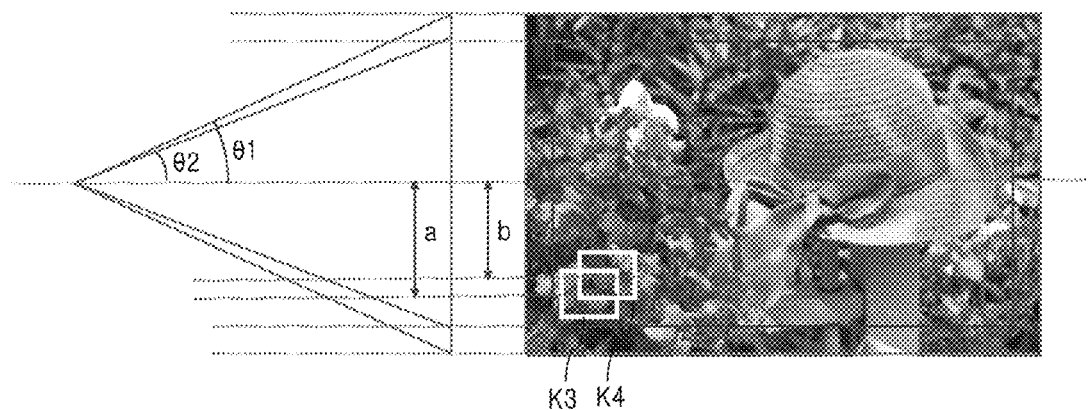
FIG. 4 is a photographic view illustrating an indicator moving along a view angle during auto focusing of a touch type portable terminal according to a comparative exemplary embodiment of the present disclosure.
Figure 5A:
FIGS. 5a and 5b are photographic views illustrating an indicator moving in response to a view angle during auto focusing of a touch type portable terminal according to an exemplary embodiment of the present disclosure.
Figure 5B:
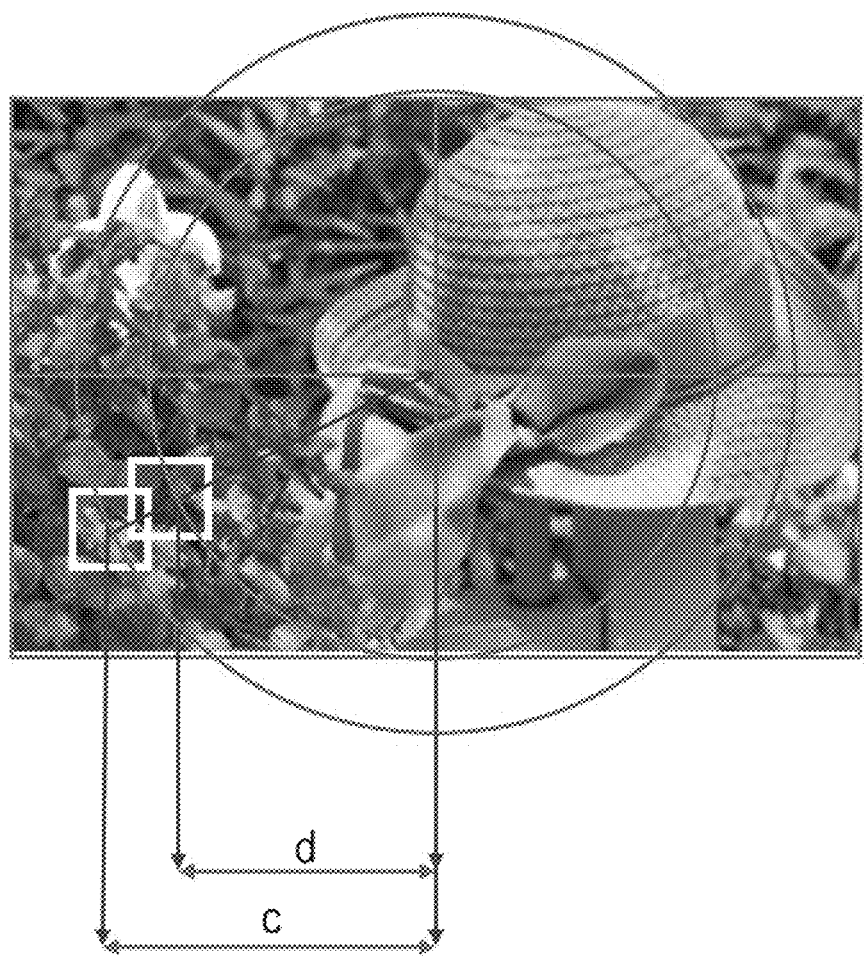

FIG. 4 is a photographic view illustrating an indicator moving along a view angle during auto focusing of a touch type portable terminal according to a comparative exemplary embodiment of the present disclosure, and FIGS. 5a and 5b are photographic views illustrating an indicator moving in response to a view angle during auto focusing of a touch type portable terminal according to an exemplary embodiment of the present disclosure.

In the touch type portable terminal according to the comparative exemplary embodiment of the present disclosure, an indicator moves along a view angle during auto focusing to be auto focused with an indicator (K3) generated during touch (prior to auto focusing) to the touch panel for auto focusing, whereby a position of an indicator (K4) generated after the auto focusing is not matched. That is, the lens of the camera module must be moved for carrying out the auto focusing.

At this time, as illustrated in FIG. 4, the lens is moved to change a view angle of the lens before and after the auto focusing, and an image of the subject after the auto focusing is a little bit enlarged over an image of the subject before the auto focusing. Thus, in a case the image of the subject before the auto focusing is photographed as 'Θ', the image of subject is photographed as 'Θ2' due to lens movement during auto focusing.

Thus, a position of the indicator (K3) before the auto focusing and a position of an indicator (K4) after the auto focusing differ due to changes in view angle of the lens before and after the auto focusing. That is, a distance 'a' between a center of an image of the subject and a center of the indicator (K3) before the auto focusing is different from a distance 'b' between a center of an image of the subject and a center of the indicator (K4) after the auto focusing. Therefore, in the touch type portable terminal according to the comparative exemplary embodiment of the present disclosure, a view angle is changed by the lens movement to move the indicator displayed on the touched area, whereby a user may view a wrong auto focusing area.

However, the touch type portable terminal according to the exemplary embodiment of the present disclosure is advantageous in that an indicator is displayed in response to changes in view angle caused by lens movement during the auto focusing to position the indicator at a touched particular area after the auto focusing, whereby a user can view an accurate auto focused area.

That is, as illustrated in FIG. 5a, a position of an indicator before the auto focusing is on a flower bud at an extreme left end of an image of subject. At this time, as illustrated in FIG. 5b, in a case the indicator is made to be positioned at the flower bud of image of the auto focused subject in response to the changes in view angle caused by lens movement, the indicator comes to be positioned at a flower bud area of the image of subject after the auto focusing.

In other words, 'd' in FIG. 5b is a distance between a center of an image of the subject and a center of the indicator after the auto focusing, as in the comparative exemplary embodiment of the present disclosure, in a case an indicator is not positioned in response to changes in view angle caused by lens movement, However, in a case an indicator is positioned in response to changes in view angle caused by lens movement as in the exemplary embodiment of the present disclosure, a distance between a center of an image of the subject and a center of the indicator after the auto focusing is moved to 'c', whereby a user can accurately display a desired auto focusing area after the auto focusing.

Figure 6:
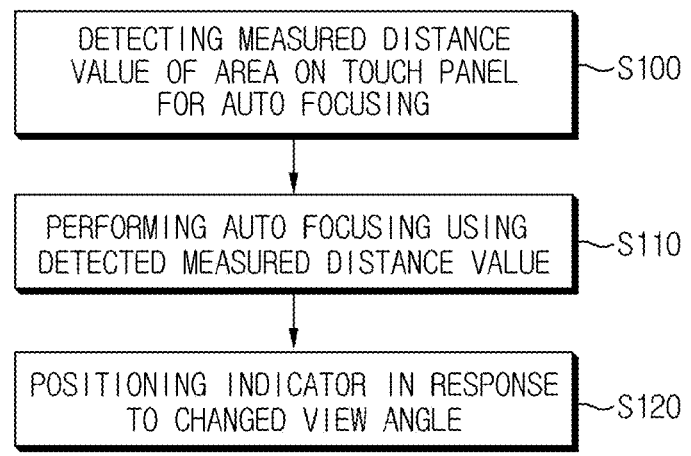
FIG. 6 is a schematic flowchart illustrating a method for auto focusing of a touch type portable terminal according to an exemplary embodiment of the present disclosure.

FIG. 6 is a schematic flowchart illustrating a method for auto focusing of a touch type portable terminal according to an exemplary embodiment of the present disclosure.

First, a measured distance value of a touched area on the touch panel (S100), in a case an area of the touch panel corresponding to a particular area of an image of a subject photographed for auto focusing, where the measured distance value is a distance between the subject and a camera module of the touched area on the touch panel.

Then, an image of the subject is obtained by performing auto focusing by moving lenses of the camera module using the detected measured distance value (S110). Successively, an indicator is positioned on the particular area of the image of the subject in response to a view angle changed by the movement of the lenses (S120), where the step (S120) may include combining the indicator to the particular area of the image of the subject using an indicator position movement distance data in response to changes in view angle stored in storage, and positioning the combined indicator.

At this time, the touch panel may be divided into a plurality of sub areas, and the touched area may be one of the plurality of sub areas.

The touch type portable terminal according to exemplary embodiments of the present disclosure has an industrial applicability in that a user is prevented from viewing a wrong auto focusing area by indicating an indicator in response to changes in view angle of lenses during auto focusing operation.

The above-mentioned touch type portable terminal may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A touch type portable terminal, the portable terminal comprising: a touch panel receiving a touch pressure; a display unit mounted at a bottom surface of the touch panel to display an image; a coordinate calculator calculating a coordinate of a touched area of the touch panel; a measured distance value detector detecting a measured distance value, which is a distance between a subject corresponding to the touched area and a camera module; storage stored with an indicator indicating the touched area; a camera module photographing the subject and performing an auto focusing by moving a lens using the measured distance value; an image processor receiving the indicator stored in the storage, moving a position of the indicator from an image of the subject auto focused by the camera module in response to a view angle changed by the lens movement, and displaying on the display unit; and a controller recognizing the touched area using the coordinate calculated by the coordinate calculator, and controlling the camera module for performing auto focusing of the touched area using the measured distance value detected by the measured distance value detector.

2. The portable terminal of claim 1, wherein the storage is stored with an indicator position moved distance data in response to the changes in view angle, and the controller may control the image processor, such that the indicator is combined with the auto focused image of the subject using the stored indicator position moved distance data in response to the changes in view angle.

3. The portable terminal of claim 1, further comprising an image extractor extracting an image of the touched touch panel, wherein the image processor matches the image of the touched touch panel extracted by the image extractor to the position of the indicator, in a case the position of the indicator is moved from the auto focused image of the subject in the camera module in response to the changes in view angle.

4. The portable terminal of claim 1, wherein the camera module includes a lens unit including lenses receiving an optical image of a subject, a lens driving unit receiving a control signal of the controller to move the lenses of the lens unit, and an image sensor converting the optical image of the subject to an electrical signal through the lens unit.

5. The portable terminal of claim 1, wherein the touch panel is divided into a plurality of sub areas, and the touched area is one of the plurality of sub areas.

6. The portable terminal of claim 5, wherein the storage is stored with the measured distance value detected by the measured distance value detector, the value being matched by each of the sub areas.

7. A touch type portable terminal, the portable terminal comprising: a touch panel receiving a touch pressure; a display unit mounted at a bottom surface of the touch panel to display an image; a coordinate calculator calculating a coordinate of a touched area of the touch panel; a measured distance value detector detecting a measured distance value, which is a distance between a subject corresponding to the touched area and a camera module; a camera module photographing the subject and performing auto focusing by moving lenses using the measured distance value; an image processor moving a position of the indicator from an image of the subject auto focused by the camera module in response to a view angle changed by the lens movement, and displaying on the display unit; and a controller recognizing the touched area using the coordinate calculated by the coordinate calculator, and controlling the camera module for performing auto focusing of the touched area using the measured distance value detected by the measured distance value detector.

8. The portable terminal of claim 7, further comprising an image extractor extracting an image of the touched touch panel, wherein the image processor matches the image of the touched touch panel extracted by the image extractor to the position of the indicator, in a case the position of the indicator is moved from the auto focused image of the subject in the camera module in response to the changes in view angle.

9. The portable terminal of claim 7, wherein the camera module includes a lens unit including lenses receiving an optical image of a subject, a lens driving unit receiving a control signal of the controller to move the lenses of the lens unit, and an image sensor converting the optical image of the subject to an electrical signal through the lens unit.

10. The portable terminal of claim 1, wherein the touch panel is divided into a plurality of sub areas, and the touched area is one of the plurality of sub areas.

11. An auto focusing method of a touch type portable terminal, the method comprising: detecting a measured distance value, which is a distance between a subject corresponding to a touched area and a camera module, in a case a touch panel area corresponding to a particular area of a photographed image of a subject is touched; obtaining an image of the subject by performing auto focusing by moving lenses of the camera module using the detected measured distance value; and positioning an indicator on the particular area of the image of the subject in response to a view angle changed by the movement of the lenses.

12. The method of claim 11, wherein the step of positioning an indicator on the particular area of the image of the subject in response to a view angle changed by the movement of the lenses includes combining the indicator to the particular area of the image of the subject using an indicator position movement distance data in response to changes in view angle stored in storage, and positioning the combined indicator.

13. The method of claim 11, wherein the touch panel is divided into a plurality of sub areas, and the touched area is one of the plurality of sub areas.

* * * * *